(12) United States Patent
Sotodate (10) Patent No.: US 11,113,798 B2
(45) Date of Patent: Sep. 7, 2021

(54) COLLATING SYSTEM, COLLATING METHOD, AND CAMERA DEVICE

(71) Applicant: PANASONIC I-PRO SENSING SOLUTIONS CO., LTD., Fukuoka (JP)

(72) Inventor: Hiromichi Sotodate, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 16/737,336

(22) Filed: Jan. 8, 2020

(65) Prior Publication Data

US 2020/0219234 A1   Jul. 9, 2020

(30) Foreign Application Priority Data

Jan. 9, 2019  (JP) .............................. JP2019-002005

(51) Int. Cl.
G06T 5/00 (2006.01)
H04N 7/18 (2006.01)
G06T 5/50 (2006.01)

(52) U.S. Cl.
CPC .............. *G06T 5/003* (2013.01); *G06T 5/50* (2013.01); *H04N 7/183* (2013.01); *G06T 2207/20081* (2013.01); *G06T 2207/20221* (2013.01); *G06T 2207/30232* (2013.01)

(58) Field of Classification Search
CPC .. G06T 5/003; G06T 5/50; G06T 2207/20221
See application file for complete search history.

(56) References Cited

U.S. PATENT DOCUMENTS

| 2005/0185066 A1* | 8/2005 | Nishimura | H04N 5/365 348/229.1 |
| 2007/0002378 A1* | 1/2007 | Nako | H04N 1/00838 358/1.18 |
| 2014/0149376 A1* | 5/2014 | Kutaragi | G06F 16/532 707/706 |
| 2016/0163029 A1* | 6/2016 | Gibbon | G06K 9/00288 382/190 |
| 2018/0234643 A1* | 8/2018 | Kobayashi | G01J 5/10 |
| 2019/0206108 A1* | 7/2019 | Yachida | G06K 9/00369 |
| 2019/0279345 A1* | 9/2019 | Kim | G06K 9/6256 |

FOREIGN PATENT DOCUMENTS

JP   2017-025621   2/2017

* cited by examiner

*Primary Examiner* — Zhubing Ren
(74) *Attorney, Agent, or Firm* — Greenblum & Bernstein, P.L.C.

(57) ABSTRACT

A camera device communicably connected to a server device includes an imaging unit that images an outdoor monitoring target area, a detection unit that detects an object appearing in a captured image of the imaged monitoring target area and generates a cut-out image of the object, an image correction unit that generates a sharpened image to be used for collating processing of the object in the server device by using the cut-out image of the object and an image correction model, and a communication unit that sends the cut-out image of the object and the sharpened image to the server device in association with identification information of the object.

16 Claims, 6 Drawing Sheets

COLLATING SYSTEM, COLLATING METHOD, AND CAMERA DEVICE

BACKGROUND OF THE INVENTION

1. Field of the Invention

The present disclosure relates to a collating system and a collating method for collating an object imaged by a monitoring camera with an object registered in advance, and a camera device for imaging the object.

2. Background Art

JP-A-2017-25621 discloses an entrance and exit management system including an authentication terminal that reads identification information and a face image of a person to be authenticated from a recording medium, an authentication device that performs authentication, and a door control device that controls opening and closing of a door based on a collating result of the authentication device. In this entrance and exit management system, the authentication device detects a person's face from video data captured by a monitoring camera and cuts out an image around the face to calculate a degree of collating between the face image of the person to be authenticated and the cut-out image in a predetermined period including the time when the authentication terminal reads the identification information. The authentication device performs control to open the door by driving the door control device when the identification information matches permission information and the degree of collating is equal to or greater than a predetermined threshold.

However, in JP-A-2017-25621, it is assumed that the face of the person to be authenticated indoors is authenticated, and there is a problem that it is difficult to authenticate the face of the person to be authenticated outdoors. This is because, for example, when the face of the person to be authenticated is captured outdoors with a monitoring camera, it is easily affected by weather conditions such as sunlight, rain, fog, and snow, and time zone conditions such as morning, noon, and night, and the accuracy of face authentication deteriorates depending on the imaging situation. For this reason, there is a possibility that the convenience of monitoring work may be decreased.

SUMMARY OF THE INVENTION

The present disclosure has been devised in view of the above-described situation of the related art, and an object thereof is to provide a collating system, a collating method, and a camera device that accurately improve the accuracy of collating processing for determining whether the captured image of the imaged object matches the monitoring object registered in the database in advance and suppress the decrease in convenience of monitoring work even in an environment where an object is imaged outdoors.

The present disclosure provides a camera device communicably connected to a server device including an imaging unit that images an outdoor monitoring target area, a detection unit that detects an object appearing in a captured image of the imaged monitoring target area and generates a cut-out image of the object, an image correction unit that generates a sharpened image to be used for collating processing of the object in the server device by using the cut-out image of the object and an image correction model, and a communication unit that sends the cut-out image of the object and the sharpened image to the server device in association with identification information of the object.

The present disclosure provides collating system including a camera device and a server device that are communicably connected to each other. The camera device has a capturing unit configured to capture an outdoor monitoring target area, a first processor configured to detect an object appearing in a captured image based imaging of the outdoor monitoring target area and generate a cut-out image of the object, and generate a sharpened image based on the cut-out image of the object and an image correction model, and a communicator configured to send the cut-out image of the object and the sharpened image to the server device in association with identification information of the object. The server device has a receiver configured to receive the cut-out image of the object and the sharpened image sent from the camera device, a second processor configured to perform collating processing of the object corresponding to the sharpened image based on the sharpened image and the image correction model, and a transmitter configured to send a result of the collating processing including identification information of the object to an external device.

The present disclosure provides a collating method implemented by a collating system including a camera device and a server device that are communicably connected to each other, the collating method having detecting, by the camera device, an object appearing in a captured image based on capturing of an outdoor monitoring target area and generating a cut-out image of the object, generating, by the camera device, a sharpened image to be used for collating processing of the object performed by the server device based on the cut-out image of the object and an image correction model, and sending, by the camera device, the cut-out image of the object and the sharpened image to the server device in association with identification information of the object, receiving, by the server device, the cut-out image of the object and the sharpened image sent from the camera device, performing, by the server device, collating processing of the object corresponding to the sharpened image based on the sharpened image and the image correction model, and sending, by the server device, a result of the collating processing including identification information of the object to an external device.

According to the present disclosure, it is possible to accurately improve the accuracy of collating processing for determining whether the captured image of the imaged object matches the monitoring object registered in the database in advance and suppress the decrease in convenience of monitoring work even in an environment where an object is imaged outdoors.

DETAILED DESCRIPTION OF THE EXEMPLARY EMBODIMENT

Hereinafter, an embodiment that specifically discloses the configuration and operation of a collating system, a collating method, and a camera device according to the present disclosure will be described in detail with reference to drawings as appropriate. However, more detailed description than necessary may be omitted. For example, detailed descriptions of already well-known matters and repeated descriptions for substantially the same configuration may be omitted. This is to avoid the following description from becoming unnecessarily redundant and to facilitate understanding by those skilled in the art. The accompanying drawings and the following description are provided to enable those skilled in the art to fully understand the present disclosure and are not intended to limit the claimed subject matter.

Outline of Embodiment 1

A collating system according to Embodiment 1 is configured to include at least a camera device and a server device that are communicably connected to each other. The camera device detects an object appearing in a captured image based on an image of an outdoor monitoring target area, generates a cut-out image of the object, generates a sharpened image to be used for collating processing of the object in the server device by using the cut-out image of the object and an image correction model, and sends the cut-out image of the object and the sharpened image to the server device in association with the identification information of the object. When receiving the cut-out image of the object and the sharpened image sent from the camera device, the server device executes collating processing on the object corresponding to the sharpened image by using the sharpened image and the image correction model and sends the execution result of the collating processing including the identification information of the object to an external device.

In the following description, the object is an object appearing in an image captured by the camera device and is also an object that is a target of collating processing in the server device. For easy understanding, a person's face is illustrated as an example of the object. However, the object is not limited to a person's face and may be a person herself or himself, a vehicle, or the like.

(Configuration of Collating System)

Figure 1:
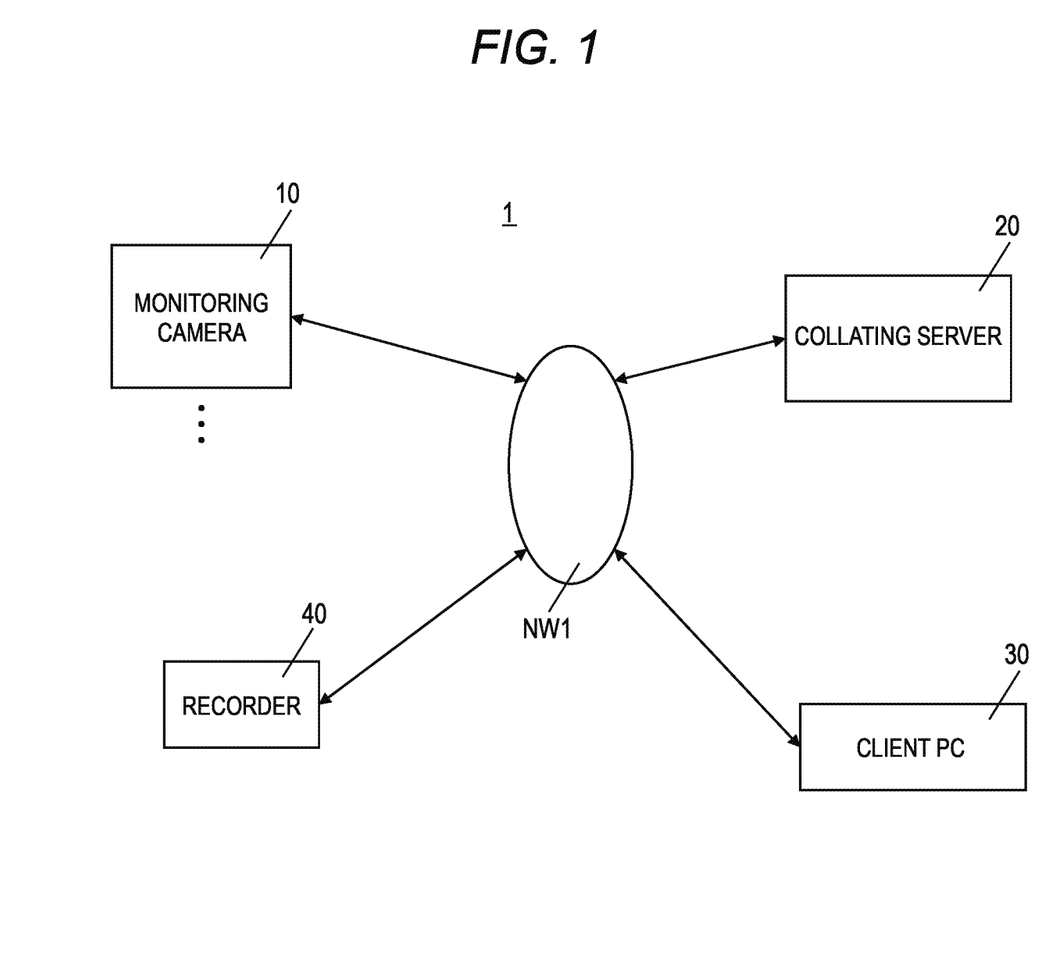
FIG. 1 is a block diagram showing a configuration example of a collating system according to Embodiment 1.

FIG. 1 is a block diagram showing a configuration example of a collating system 1 according to Embodiment 1. The collating system 1 includes at least one monitoring camera 10, a collating server 20, a client personal computer (PC) 30, and a recorder 40. The recorder 40 may not be included in the configuration of the collating system 1. The monitoring camera 10, the collating server 20, the client personal computer (PC) 30, and the recorder 40 are connected to each other via a network NW1 so as to be able to transmit and receive data or information to and from each other.

The network NW1 is a wired network or a wireless network. The wired network is, for example, an intranet such as a wired local area network (LAN) or the Internet. The wireless network is, for example, a wireless LAN, 4G (4th generation mobile communication system) or 5G (5th generation mobile communication system).

The monitoring camera 10 (an example of a camera device) is installed outdoors and always images an outdoor monitoring target area where an imaging environment is likely to change depending on conditions such as time of day or weather, regardless of day or night. The monitoring camera 10 is not limited to being installed outdoors. For example, even if installed indoors, the monitoring camera 10 may image a location where an imaging environment is likely to change similarly to the outdoors like a place before the neon of a casino as a monitoring target area of the imaging target. The monitoring camera 10 may be a fixed camera with a fixed angle of view or may be a PTZ (Pan Tilt Zoom) camera that can change the position thereof (in other words, the direction of the optical axis of the built-in lens) by at least one of pan rotation and tilt rotation and change zoom magnification by zoom processing.

The monitoring camera 10 detects an object (for example, a person's face) appearing in a captured image obtained by imaging a monitoring target area and generates a cut-out image obtained by cutting out the detected object. The monitoring camera 10 can use an image correction model (see below) configured by a neural network capable of realizing machine learning such as deep learning, for example and generates a corrected image (an example of a sharpened image) obtained by correcting or estimating the cut-out image of the object by using the image correction model. The monitoring camera 10 transmits each of the cut-out image and the corrected image of the object to the collating server 20 and the recorder 40 via the network NW1 in association with the identification information of the object. The identification information of the object may include date and time information when the object is imaged by the monitoring camera 10 and location information of the monitoring camera 10 in addition to the information specifying the type of the object.

Here, in this specification, the outdoor means the outdoor (outside) of a building such as a facility. The monitoring target area is a place where suspicious persons (for example, suspects, criminals, or ex-convicts of an incident or accident) registered in a registration database (see below) stored in the collating server 20 are likely to drop in, such as near the entrance and exit of a store, a parking lot, a road, and the like, but is not limited thereto. In the collating system 1 shown in FIG. 1, the number of monitoring cameras 10 is not limited to one, but only one is shown in FIG. 1 for simplicity of description. The internal configuration of the monitoring camera 10 will be described later with reference to FIG. 2.

The collating server 20 (an example of a server device) is configured as an on-premises server installed in a monitoring room (not shown) in a building of a company or the like to which an operator or administrator of the collating system 1 belongs, or a cloud server. The collating server 20 can use the same image correction model as the image correction model (see above) that can be used by the monitoring camera 10 and executes object collating processing by using the image correction model and the corrected image of an object when two types of images (specifically, a cut-out image and a corrected image of the object) sent from the monitoring camera 10 are received. The collating server 20 transmits the collating result to the client PC 30 via the network NW1 and displays the result. The internal configuration of the collating server 20 will be described later with reference to FIG. 3.

The client PC 30 (an example of an external device) is configured by a computer device having a normal PC hardware configuration and is used by a user of the collating system 1 (for example, a monitoring company that practically performs monitoring work on the monitoring target area). When receiving the collating result (for example, see FIG. 6) sent from the collating server 20, the client PC 30 displays the collating result on a display (not shown) built in the client PC 30.

The recorder 40 includes a storage capable of recording data or information. When receiving a captured image including identification information of an object sent from the monitoring camera 10 (for example, a raw image captured by the monitoring camera 10), the recorder 40 records the captured image in the storage in association with the identification information of the object. That is, the recorder 40 can record the data of the captured original image of the monitoring camera 10 in which evidence is recognized (that is, has evidence ability). When receiving both the captured image including the identification information of the object and the cut-out image of the object, the recorder 40 may record the identification information of the object and the captured image in the storage in association with the identification information of the object.

Figure 2:
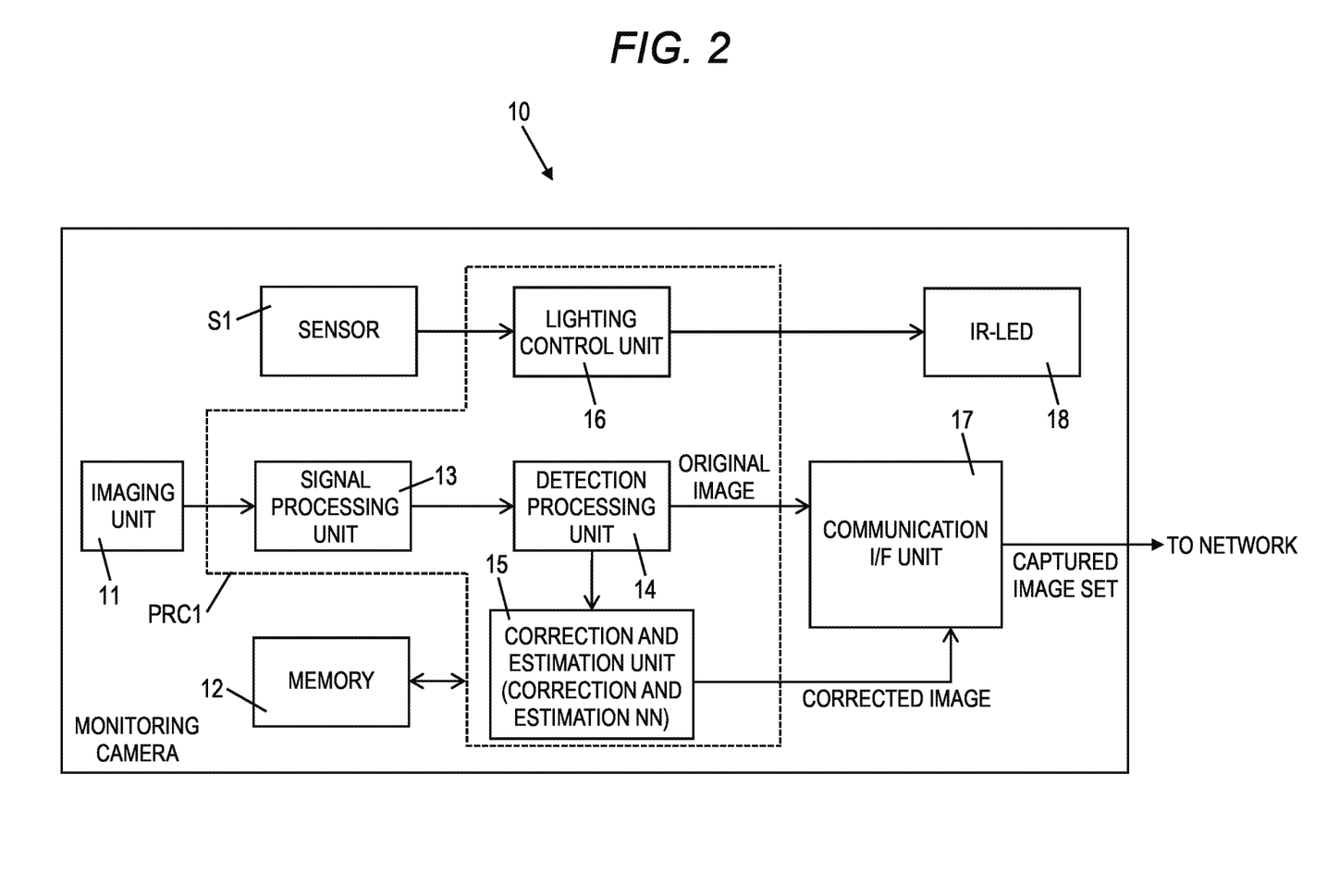
FIG. 2 is a block diagram showing a hardware configuration example of a monitoring camera.

FIG. 2 is a block diagram showing a hardware configuration example of the monitoring camera 10. The monitoring camera 10 includes an imaging unit 11, a memory 12, a signal processing unit 13, a detection processing unit 14, a correction and estimation unit 15, a lighting control unit 16, a communication interface unit 17, an IR-LED 18, and a sensor S1. The signal processing unit 13, the detection processing unit 14, the correction estimation unit 15, and the lighting control unit 16 are realized by, for example, a processor PRC1 configured by combining any one or two or more of a central processing unit (CPU), a digital signal processor (DSP), a field programmable gate array (FPGA), or a graphical processing unit (GPU).

The sensor S1 is configured by a sensor element that detects the illuminance (brightness) around the monitoring camera 10 and outputs a detection value of the illuminance to the lighting control unit 16. The sensor S1 detects the illuminance so that the lighting control unit 16 determines whether the current time is daytime or nighttime, for example, based on ambient illuminance. The processor PRC1 stores a timer capable of measuring the current time and may emit IR light from the IR-LED 18 when it is determined that it is nighttime according to the current time measured by the timer. In this case, the sensor S1 may be omitted.

The imaging unit 11 includes a focus lens that can adjust the focal length, a zoom lens that can change the zoom magnification, a charge coupled device (CCD) or complementary metal oxide semiconductor (CMOS) as an imaging element, and a gain adjustment unit that can adjust the sensitivity of the imaging element. The imaging unit 11 images the monitoring target area and outputs an image signal obtained by the imaging to the signal processing unit 13.

The memory 12 includes, for example, a random-access memory (RAM) and a read only memory (ROM) and temporarily stores a program necessary for executing the operation of the monitoring camera 10 and data or information generated by the processor PRC1 during the operation. The RAM is a work memory used when the processor PRC1 operates, for example. The ROM stores a program and data for controlling the processor PRC1 in advance, for example.

The processor PRC1 controls the operation of each unit of the monitoring camera 10. The processor PRC1 functions as a control unit for the monitoring camera 10 and performs control processing for overall control of the operation of each unit of the monitoring camera 10, data input and output processing with each unit of the monitoring camera 10, data operation (calculation) processing, and data storage processing. The processor PRC1 operates in accordance with execution of a program stored in the ROM in the memory 12.

When the monitoring camera 10 is a PTZ camera, the processor PRC1 reads a preset value stored in the memory 12, and controls the position of the monitoring camera 10 to a position corresponding to the preset value (for example, pan rotation or tilt rotation) or controls the zoom magnification to be changed. The preset value is data in which a pan rotation angle, a tilt rotation angle, and a zoom magnification are associated with each other. The processor PRC1 transmits the cut-out image (an example of an original image) of the object generated by the detection processing unit 14 and the corrected image (an example of an image for collating processing) of the object generated by the correction and estimation unit 15 to the collating server 20 via the communication interface unit 17 in association with the identification information of the object. As described above, the processor PRC1 may transmit the cut-out image (an example of an original image) of the object generated by the detection processing unit 14 to the recorder 40 via the communication interface unit 17 in association with the identification information of the object.

The signal processing unit 13 performs various kinds of signal processing (for example, analog-digital conversion, resolution conversion, aperture conversion, gamma correction, noise removal, contour enhancement) on the image signal of the image captured by the imaging unit 11 to generate captured image data of the monitoring target area. The signal processing unit 13 outputs captured image data in the monitoring target area to the detection processing unit 14.

When receiving the captured image data output from the signal processing unit 13, the detection processing unit 14 (an example of a detection unit) detects an object (for example, a person's face) appearing in the captured image, and generates a cut-out image (original image) obtained by cutting out the portion of the object detected from the captured image, and outputs the cut-out image to each of the correction and estimation unit 15 and the communication interface unit 17.

The correction and estimation unit 15 (an example of an image correction unit) can use an image correction model, and generates a corrected image of the object by using the cut-out image of the object output from the detection processing unit 14. The image correction model is configured by a neural network (hereinafter, referred to as "correction and estimation network") that can realize machine learning such as deep learning. The network may be abbreviated as "NN" as needed. The correction and estimation unit 15 generates a high-quality sharpened image to corresponding to the image quality degradation factor of the captured image generated by outdoor imaging of the object by using the cut-out image of the object and the image correction model. The image correction model is learned and configured in advance by the collating server 20 before the collating system 1 is actually operated and is sent from the collating server 20 and can be used in the monitoring camera 10.

A first example of the image quality degradation factor is unevenness (for example, unevenness caused by a difference in irregularity of a face) occurring in a partial region of an object due to sunlight. The correction and estimation unit 15 uses the image correction model to generate a sharpened image (an example of corrected image) in which the image quality of the entire object or a partial region of the object is improved (sharpened) in consideration of the occurrence of unevenness in a partial region of the object during outdoor imaging (in other words, generates a high-quality image obtained by estimating and correcting a degraded portion, which is a portion where unevenness is likely to occur). The high-quality image here means that the object has a high-quality image that can be used for the collating processing in the collating server 20 even if unevenness occurs in a partial region of the object.

A second example of the image quality degradation factor is a shadow (for example, shadow occurring by wearing a hat) occurring in a partial region of an object due to sunlight. The correction and estimation unit 15 uses the image correction model to generate a sharpened image (an example of a corrected image) in which the image quality of the entire object or a partial region of the object is improved (sharpened) in consideration of the occurrence of a shadow in a partial region of the object during outdoor imaging (in other words, generates a high-quality image obtained by estimating and correcting a degraded portion where a shadow is likely to occur). The high-quality image here means that the object has a high-quality image that can be used for the collating processing in the collating server 20 even if a shadow occurs in a partial region of the object.

A third example of the image quality degradation factor is low illuminance noise occurring on an object due to night imaging. The correction and estimation unit 15 uses the image correction model to generate a sharpened image (an example of a corrected image) in which the image quality of the entire object is improved (sharpened) in consideration of the occurrence of low illuminance noise in the object during outdoor imaging (in other words, generates a high-quality image obtained by estimating and correcting a degraded portion where low illuminance noise is likely to occur). The high-quality image here means that the object has a high-quality image that can be used for the collating processing in the collating server 20 even if low illuminance noise occurs in the object, for example.

A fourth example of the image quality degradation factor is white saturation (so-called halation) occurring in the object by IR light emitted from the IR-LED 18 at night. This white saturation may be caused by emission of a headlight such as a vehicle at night. The correction and estimation unit 15 uses the image correction model to generate a sharpened image (an example of a corrected image) in which the image quality of the entire object is improved (sharpened) in consideration of the occurrence of white saturation in the object during outdoor imaging (in other words, generates a high-quality image obtained by estimating and correcting a degraded portion where white saturation is likely to occur). The high-quality image here means that the object has a high-quality image that can be used for the collating processing in the collating server 20 even if white saturation occurs in the object, for example.

The image quality degradation factor is not limited to the above-described first to fourth examples. Similarly, in other examples, the correction and estimation unit 15 can generate a sharpened image corresponding to the image quality degradation factor.

When receiving a luminance detection value from the sensor S1, the lighting control unit 16 determines whether the current time is daytime or nighttime. The lighting control unit 16 controls the emission of the IR-LED 18 so that the IR light is emitted from the IR-LED 18 when it is determined that the current time is nighttime. When it is determined that the current time is not nighttime (for example, the current time is in the morning), the lighting control unit 16 controls the emission of the IR-LED 18 so as not to execute (in other words, interrupt) the emission of the IR light from the IR-LED 18.

The communication interface unit 17 is connected to the network NW1 and transmits and receives data or information to and from an external device connected to the network NW1. When receiving the cut-out image (original image) of the object output from the detection processing unit 14 and the corrected image of the object output from the correction and estimation unit 15, the communication interface unit 17 transmits a captured image set made up of the cut-out image and the corrected image of the object together with the identification information of the object to each of the collating server 20 and the recorder 40. In FIG. 2, for simplification of illustration, "interface" is abbreviated as "IF".

The IR-LED (Light Emitting Diode) 18 (an example of an IR lighting unit) emits near-infrared light (so-called infrared radiation (IR) light) on the monitoring target area within the angle of view of the imaging unit 11 under the control of the lighting control unit 16. Thereby, the imaging unit 11 can image the monitoring target area even at night. The lighting control unit 16 and the IR-LED 18 may be provided as an external lighting device separate from the monitoring camera 10 without being provided in the monitoring camera 10. However, even in this case, the lighting control unit 16 and the IR-LED 18 emit IR light, for example, by control from the processor PRC1 of the monitoring camera 10 via the communication IF 17. Further, the lighting control unit 16 and the IR-LED 18 may be simply omitted from the configuration of the monitoring camera 10.

Figure 3:
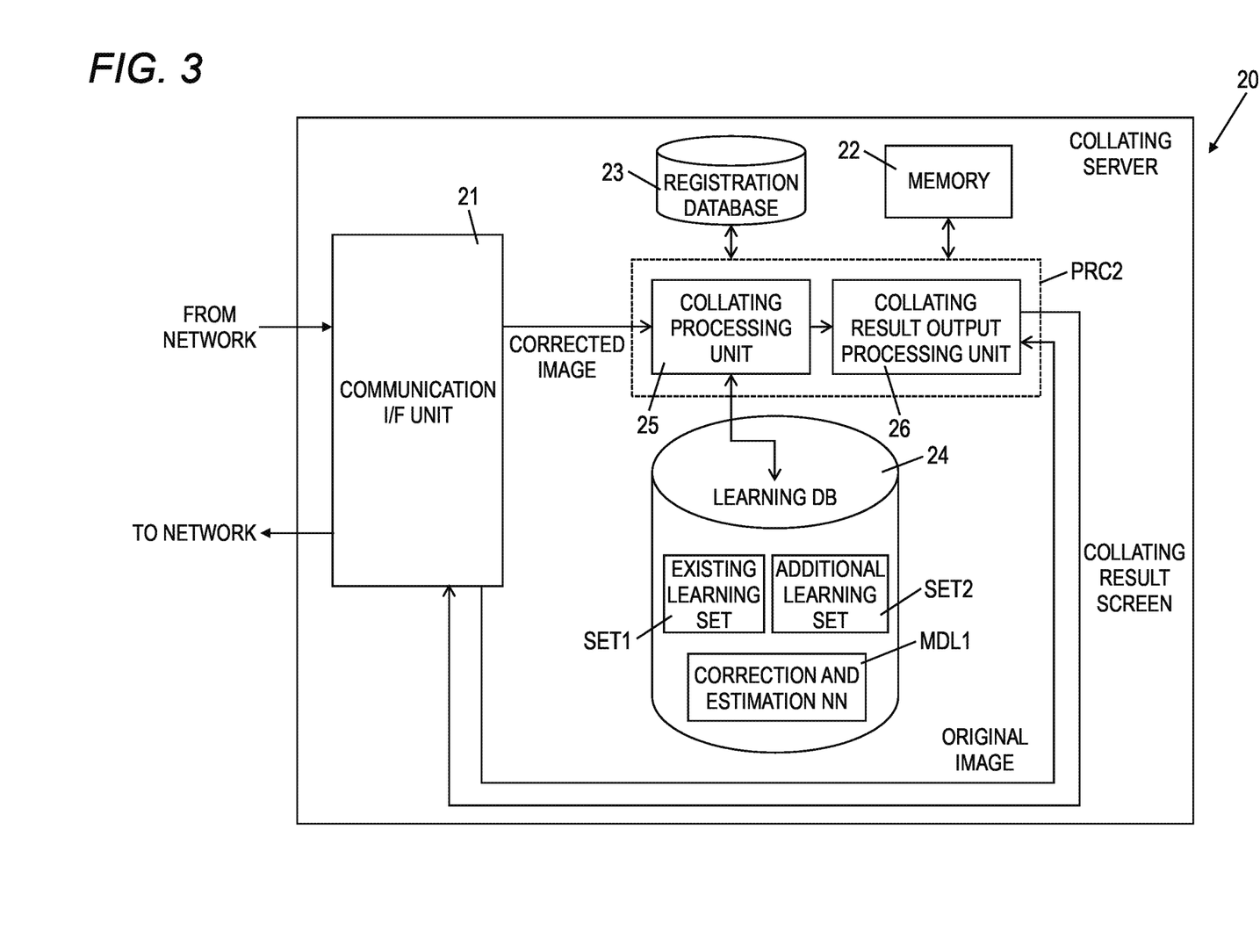
FIG. 3 is a block diagram showing a hardware configuration example of a collating server.

FIG. 3 is a block diagram showing a hardware configuration example of the collating server 20. The collating server 20 includes a communication interface unit 21, a memory 22, a registration database 23, a learning database 24, a collating processing unit 25, and a collating result output processing unit 26. The collating processing unit 25 and the collating result output processing unit 26 are realized by, for example, a processor PRC2 configured by combining any one of CPU, DSP, FPGA, GPU, or two or more.

The communication interface unit 21 is connected to the network NW1 and transmits and receives data or information to and from an external device connected to the network NW1. When receiving the captured image set (including identification information of an object) sent from the monitoring camera 10, the communication interface unit 21 separates the data of the captured image set into the cut-out image (original image) of the object and the corrected image of the object. The communication interface unit 21 outputs the cut-out image (original image) of the object to the collating result output processing unit 26 and outputs the corrected image of the object to the collating processing unit 25. In FIG. 3, for simplification of illustration, "interface" is abbreviated as "IF".

The memory 22 includes, for example, a RAM and a ROM and temporarily stores a program necessary for executing the operation of the collating server 20 and data or information generated by the processor PRC2 during the operation. The RAM is a work memory used when the processor PRC2 operates, for example. The ROM stores a program and data for controlling the processor PRC2 in advance, for example.

The registration database 23 is a database that registers and stores face images of a plurality of different suspicious persons that are likely to appear in the monitoring target area and personal identification information (for example, name, age, address, occupation) related to the suspicious persons in association with each other. The face image of the suspicious person accumulated in the registration database 23 and the personal identification information related to the suspicious person are associated with each other and updated (added or deleted) as appropriate.

The learning database 24 is a database that stores an existing learning set SET1 registered as a result of the learning processing (see FIG. 4) executed in the collating server 20 before the collating system 1 is actually operated, an additional learning set SET2, and a correction and estimation network MDL1 (an example of an image correction model). As will be described later, the learning processing in the collating server 20 may be executed during actual operation of the collating system 1, and in this case, the contents of the learning database 24 are updated (added or changed) as appropriate even during actual operation.

The existing learning set SET1 (an example of a first image set) is an image data storage device in which face images of a large number of unspecified different persons are registered, which is used for learning processing in the collating server 20. Each face image of a different person includes, for example, each face image of the person such as a front face, a side view, a face facing down, and a face facing up, and each image of a face imaged in advance under various outdoor conditions or a face that has been subjected to a plurality of types of image processing in a pseudo manner as if imaged outdoors (for example, a face with unevenness due to sunlight, a face with shadows on part of the face due to sunlight, a face with low illuminance noise caused by night imaging, or a face that has been overexposed by emission from the IR-LED 18). Such pseudo image processing is executed by the processor PRC2 of the collating server 20, for example.

The additional learning set SET2 (an example of a second image set) is an image data storage device in which a sharpened image generated during the learning processing by the collating server 20 corresponding to an image quality degradation factor (that is, new) different from the image quality degradation factor used when generating a person's face image stored in the existing learning set SET1 is registered. The sharpened image data registered in the additional learning set SET2 is image data generated by the learning processing by the processor PRC2.

The correction and estimation network MDL1 (an example of an image correction model) is configured by a neural network that can realize machine learning such as deep learning. The correction and estimation MDL1 generates a high-quality sharpened image that matches the input image (for example, an image corresponding to a cut-out image of an object) with a high probability corresponding to the image quality degradation factor of the captured image that is caused by outdoor imaging, with a neural network that constitutes the correction and estimation network MDL1 itself. Here, the neural network constituting the correction and estimation network MDL1 is a network (image correction model) configured by one or more neurons constituting an input layer, an intermediate layer, and an output layer, for example. Each neuron is set with a learned parameter for performing a calculation for generating a high-quality sharpened image corresponding to an image quality degradation factor of a captured image caused by outdoor imaging.

The processor PRC2 controls the operation of each unit of the collating server 20. The processor PRC2 functions as a control unit for the collating server 20 and performs control processing for overall control of the operation of each unit of the collating server 20, data input and output processing with each unit of the collating server 20, data operation (calculation) processing, and data storage processing. The processor PRC2 operates in accordance with execution of a program stored in the ROM in the memory 22.

When receiving the corrected image of the object from the communication interface unit 21, the collating processing unit 25 uses the registration database 23 and the learning database 24 (for example, correction and estimation network MDL1) to execute processing (that is, collating processing) for determining whether or not a face image of a person that substantially matches (including matches) the corrected image exists in the registration database 23. The collating processing unit 25 outputs the collating processing result (collating result) to the collating result output processing unit 26.

The collating result output processing unit 26 receives the collating result output from the collating processing unit 25 and also receives the cut-out image (original image) of the object output from the communication interface unit 21. When a collating result indicating that there is a person's face image that substantially matches (see above) the corrected image used in the collating processing is obtained, the collating result output processing unit 26 generates a collating result screen (see FIG. 6, an example of a collating result) in which the cut-out image of the object corresponding to the person and the face image of the collating person in the registration database 23 is associated with the identification information of the object. The collating result output processing unit 26 outputs a collating result screen to the communication interface unit 21.

Figure 6:
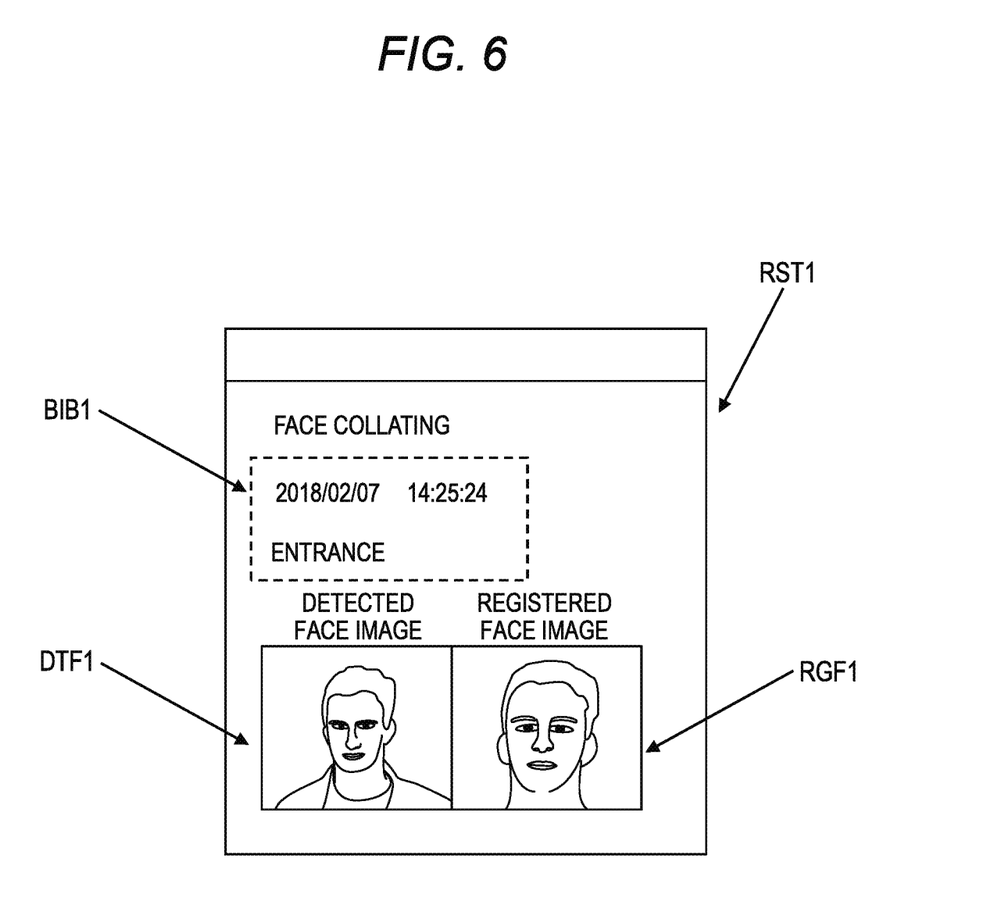
FIG. 6 is a diagram showing an example of a collating result screen displayed on a client PC.

Here, a collating result screen RST1 will be described with reference to FIG. 6. FIG. 6 is a diagram showing an example of the collating result screen RST1 displayed on the client PC 30. The collating result screen RST1 is a display screen generated by the collating server 20 as a result of collating processing (face collating) by the collating server 20. The collating result screen RST1 shows bibliographic information BIB1 related to the object of the collating processing, a cut-out image DTF1 of the object that is an original image captured by the monitoring camera 10, and the face image (registered face image RGF1) registered in the registration database 23 that is determined to substantially match the cut-out image DTF1.

The bibliographic information BIB1 indicates, for example, the date and time when a collating target person is captured by the monitoring camera 10 (example: Feb. 7, 2018, 14:25:24) and the installation location (example: entrance) of the monitoring camera 10. The information indicated by the bibliographic information BIB1 is included, for example, as identification information of an object in the data of the captured image set transmitted from the monitoring camera 10 to the collating server 20. Thereby, a user of the client PC 30 can easily grasp the result of the collating processing by the collating server 20 on the collating result screen RST1.

Figure 4:
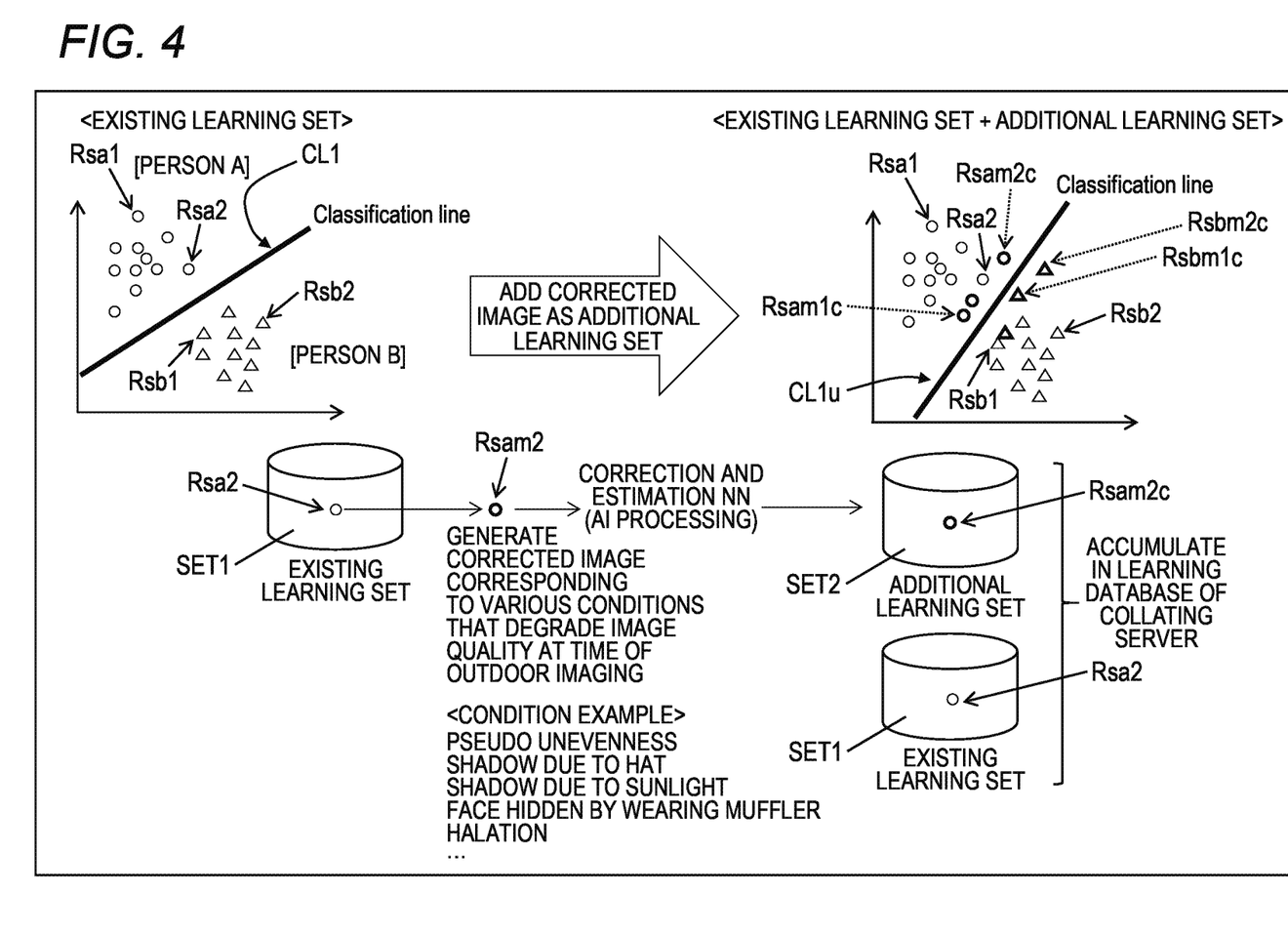
FIG. 4 is a diagram schematically showing an outline of learning processing executed in advance by the collating server.

Next, an outline of the learning processing executed by the collating server 20 will be described with reference to FIG. 4. FIG. 4 is a diagram schematically showing the outline of the learning processing executed in advance by the collating server 20. If the processor PRC2 having a high-spec specification is installed, the collating server 20 may execute the learning processing shown in FIG. 4 concurrently with the collating processing during actual operation.

In FIG. 4, face images of a large number of unspecified different persons are registered in the existing learning set SET1. As described above, each face image of a different person includes, for example, each face image of the person such as a front face, a side view, a face facing down, and a face facing up, and each image of a face (see above) imaged under various outdoor conditions.

In the graph corresponding to the existing learning set SET1, for example, a face image Rsa2 of a person A himself or herself and a face image of the person A captured under various outdoor conditions or a face image Rsa1 that has been subjected to a plurality of types of image processing in a pseudo manner as if imaged outdoors are mapped so as to be distinguishable by a classification line CL1. As shown in FIG. 4, a plurality of face images Rsa1 may be provided as many as the number of faces captured under various outdoor conditions, and a plurality of face images Rsa2 may be provided as many as the number of directions in which the person A faces front, side, down, and up.

Similarly, for example, a face image Rsb2 of a person B himself or herself and a face image of a person B captured under various outdoor conditions or a face image Rsb1 that has been subjected to a plurality of types of image processing in a pseudo manner as if imaged outdoors are mapped so as to be distinguishable by the classification line CL1. Similarly, as shown in FIG. 4, a plurality of face images Rsb1 may be provided as many as the number of faces captured under various outdoor conditions, and a plurality of face images Rsb2 may be provided as many as the number of directions in which the person B faces the front, the side, the bottom, and the top.

In the existing learning set SET1, face images of a large number of unspecified different persons are registered. Each face image of a different person is, for example, each face image of the person such as a front face, a side view, a face facing down, and a face facing up, and each image of a face (hereafter, referred to as "outdoor imaging face") imaged in advance under various outdoor conditions or a face image that has been subjected to a plurality of types of image processing in a pseudo manner as if imaged outdoors.

The collating server 20 generates a pseudo image to which image quality degradation factors at the time of new outdoor imaging different from the outdoor imaging face stored in the existing learning set SET1 are applied, for each face image of a large number of unspecified different persons stored in the existing learning set SET1. The collating server 20 learns and adds a sharpened image (that is, a sharpened image that compensates for image degradation caused by outdoor imaging) corresponding to the image generated in a pseudo manner and accumulates the image. A new image quality degradation factor at the time of imaging outdoors is, for example, partial disappearance in which a partial region of an object is hidden by wearing a muffler or a knit cap in winter.

Specifically, the collating server 20 generates a degraded image Rsam2 in which the image quality of the person's face image Rsa2 (for example, the face image of the person A himself or herself) stored in the existing learning set SET1 is degraded in a pseudo manner so as to be suitable for imaging outdoors, based on the new outdoor image quality degradation factor in the processor PRC2. Furthermore, the collating server 20 uses the correction and estimation network MDL1 to generate a high-quality sharpened image Rsam2c corresponding to the image quality degradation factor that degrades the image quality from the face image Rsa2 to the degraded image Rsam2, in the processor PRC2. The collating server 20 adds and stores the sharpened image Rsam2c to the additional learning set SET2.

In the graphs corresponding to the existing learning set SET1 and the additional learning set SET2, for example, the face image Rsa2 of the person A himself or herself, the face image Rsa1 of the person A captured under various outdoor conditions (see above), and the sharpened images Rsam2c and Rsam1c generated corresponding to a new image quality degradation factor during the learning processing are mapped so as to be distinguishable by a classification line CL2.

Similarly, for example, the face image Rsb2 of the person B himself or herself, the face image Rsb1 of the person B captured under various outdoor conditions (see above), and sharpened images Rsbm2c and Rsbm1c generated corresponding to a new image quality degradation factor during the learning processing are mapped so as to be distinguishable by a classification line CL1u.

In this way, the collating server 20 generates a corrected image (sharpened image) corresponding to a new image quality degradation factor so as to be suitable for various conditions (for example, see FIG. 4) at the time of outdoor imaging for the face image stored in the existing learning set SET1 and stores the corrected image in the additional learning set SET2. Thereby, when performing the collating processing with the registration database 23 by the prior learning processing, the collating server 20 can adaptively update the classification line for classifying the suspicious persons so as to be distinguishable according to the state of the learning processing. That is, since the collating server 20 can enrich the sharpened image corresponding to the factor that degrades the image quality at the time of outdoor imaging and can use the enriched image during the collating processing, it is possible to improve the collating accuracy. As described above, the collating server 20 can execute the same learning processing even during the actual operation of the collating system 1 to enrich the contents and the accumulation amount of the additional learning set SET2, and it is possible to further improve the accuracy of the collating processing.

(Operation of Collating System)

Figure 5:
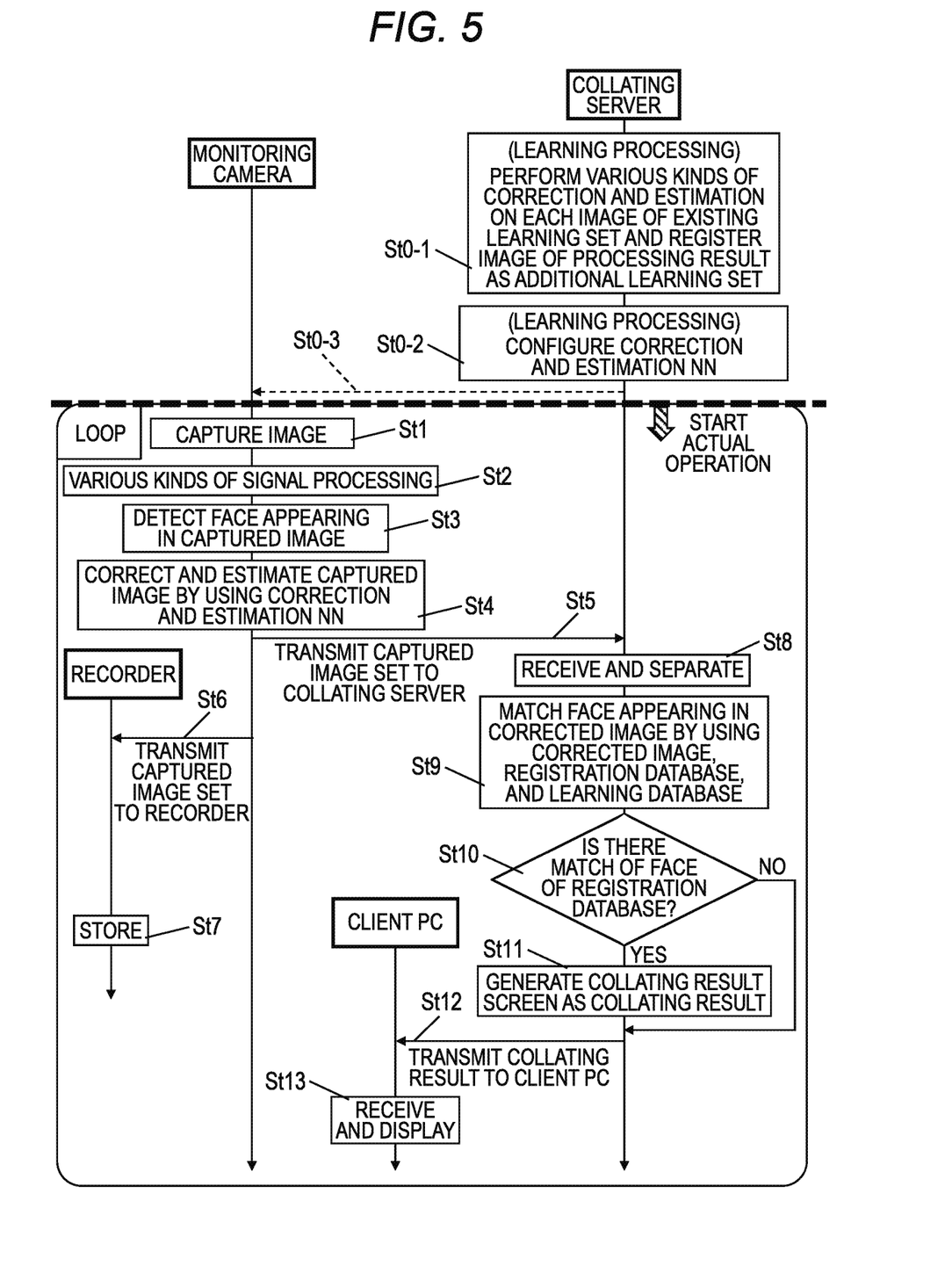
FIG. 5 is a sequence diagram showing an operation procedure of the collating system according to Embodiment 1 in time series.

Next, the operation procedure of the collating system 1 according to Embodiment 1 will be described with reference to FIG. 5. FIG. 5 is a sequence diagram showing the operation procedure of the collating system 1 according to Embodiment 1 in time series. In order to simplify the description of FIG. 5, it is assumed that the learning processing by the collating server 20 is executed in advance before the actual operation of the collating system 1 is started, but as described above, the learning processing may be executed during actual operation.

In FIG. 5, the collating server 20 executes the learning processing described with reference to FIG. 4 before the actual operation of the collating system 1 is started. Specifically, the collating server 20 generates a corrected image (sharpened image) corresponding to a new image quality degradation factor in the processor PRC2 so as to be suitable for various conditions (for example, see FIG. 4) at the time of outdoor imaging for the face image stored in the existing learning set SET1 (St0-1). The collating server 20 registers and accumulates the corrected image (sharpened image) generated as the processing result of step St0-1 in the additional learning set SET2 (St0-1).

The collating server 20 configures the image correction model (for example, the correction and estimation network MDL1 configured by a neural network) by the learning processing in step St0-1 and stores the model in the learning database 24 (St0-2). In FIG. 5, the collating server 20 executes the learning processing of steps St0-1 and St0-2 before the start of the actual operation, but the execution timing of the learning processing may not be limited to the time point before the start of actual operation. For example, the operation of each device constituting the collating system 1 may be temporarily interrupted during actual operation, and the collating server 20 may execute learning processing of steps St0-1 and St0-2 to update the contents of the additional learning set SET2 and the parameters of the correction and estimation network MDL1. After the learning, the operation of each device constituting the collating system 1 may be resumed.

After step St0-2, the correction and estimation network MDL1 stored in the learning database 24 of the collating server 20 may be transmitted to the monitoring camera 10 via the network NW1 and set to be executable in the monitoring camera 10 (St0-3). The processing of step St0-3 may be executed by human work.

When actual operation is started in the environment where the collating system 1 is installed, the monitoring camera 10 captures an image of the monitoring target area in the imaging unit 11 (St1) and executes various kinds of signal processing in the signal processing unit 13 (St2). The monitoring camera 10 detects an object (for example, a person's face) appearing in the captured image of the monitoring target area subjected to the signal processing by the signal processing unit 13 in the detection processing unit 14 (St3) to generate a cut-out image of the detected object. The monitoring camera 10 uses the cut-out image of the object generated by the detection processing unit 14 to generate a corrected image (sharpened image) of the object in the correction and estimation unit 15 (St4).

The monitoring camera 10 transmits the data of the captured image set in which the cut-out image of the object generated in step St3 and the corrected image (sharpened image) of the object generated in step St4 are associated with the identification information of the object to the collating server 20 (St5) and also transmits to the recorder 40 (St6). When receiving the data of the captured image set sent from the monitoring camera 10, the recorder 40 stores the data in the built-in storage (St7).

When receiving the data of the captured image set sent from the monitoring camera 10, the collating server 20 separates the cut-out image (original image) of the object and the corrected image of the object (St8). The collating server 20 uses the corrected image of the object, the registration database 23, and the learning database 24 to determine whether or not the face appearing in the corrected image of the object matches the face of the person registered in the registration database 23 in the collating processing unit 25 (St9, collating processing).

When it is determined that the face appearing in the corrected image of the object matches the face of the person registered in the registration database 23 (St10, YES), the collating server 20 generates a collating result screen (see FIG. 6, an example of the collating result) in which the cut-out image of the object and the face image of the matched person in the registration database 23 are associated with the identification information of the object in the collating result output processing unit 26 (St11). When it is determined that the face appearing in the corrected image of the object does not match the face of the person registered in the registration database 23 (St10, NO), the collating server 20 omits the processing of step St11 and generates a determination result of the collating processing of step St9 as a collating result. The determination result of the collating processing in step St9 is, for example, a message that the face appearing in the corrected image of the object does not match the face of the person registered in the registration database 23. The collating server 20 transmits the generated collating result to the client PC 30 (St12).

When receiving the collating result sent from the collating server 20, the client PC 30 displays the collating result on, for example, a display built in the client PC 30 (St13).

As described above, the monitoring camera 10 according to Embodiment 1 is communicably connected to the collating server 20, captures an image of an outdoor monitoring target area, detects an object (for example, a person's face) appearing in the captured image of the imaged monitoring target area, and generates a cut-out image of the object. The monitoring camera 10 generates a sharpened image used for the collating processing of the object in the collating server 20 by using the cut-out image of the object and the image correction model (for example, the correction and estimation network MDL1) and sends the cut-out image and the sharpened image of the same object to the collating server 20 in association with the identification information of the object.

Thereby, the monitoring camera 10 can generate in advance a sharpened image corresponding to various factors that degrade the image quality of the captured image when imaged outdoors before being sent to the collating server 20 even in an environment where an object (for example, a person's face) is imaged outdoors. Therefore, the monitoring camera 10 can accurately improve the collating accuracy of the collating processing in the collating server 20 as to whether or not the sharpened image of the captured object matches the monitoring object (for example, the face of a suspicious person) registered in the registration database 23 in advance. That is, the monitoring camera 10 can suppress a decrease in convenience of monitoring work.

In the collating system 1 according to Embodiment 1, the monitoring camera 10 detects an object (for example, a person's face) appearing in a captured image based on the imaging of an outdoor monitoring target area and generates a cut-out image of the object. The monitoring camera 10 generates a sharpened image used for the collating processing of the object in the collating server 20 by using the cut-out image of the object and the image correction model (for example, the correction and estimation network MDL1) and sends the cut-out image and the sharpened image corresponding to the same object to the collating server 20 in association with the identification information of the object. When receiving the cut-out image of the object and the sharpened image sent from the monitoring camera 10, the collating server 20 executes collating processing of the object corresponding to the sharpened image by using the sharpened image and the image correction model. The collating server 20 sends the execution result of the collating processing including the identification information of the object to the client PC 30.

Thereby, the monitoring camera 10 can generate in advance a sharpened image corresponding to various factors that degrade the image quality of the captured image when imaged outdoors before being sent to the collating server 20 even in an environment where an object (for example, a person's face) is imaged outdoors. Therefore, the monitoring camera 10 can accurately improve the collating accuracy of the collating processing in the collating server 20 as to whether or not the sharpened image of the captured object matches the monitoring object (for example, the face of a suspicious person) registered in the registration database 23 in advance. That is, the monitoring camera 10 can suppress a decrease in convenience of monitoring work. The monitoring camera 10 generates a sharpened image that is used for the object collating processing by using the same image correction model as the image correction model configured by the correction and estimation network MDL1 used in the collating server 20. Thereby, the collating server 20 can execute the collating processing quickly because it is possible to omit the processing of generating a sharpened image of the object during the collating process, for example, compared with the case where the corrected image of the object is not received from the monitoring camera 10.

The collating server 20 has the existing learning set SET1 that stores an image related to the object, generates a sharpened image by using the image related to the object and the image correction model corresponding to the image quality degradation factor caused by outdoor imaging of the object, and stores the generated sharpened image in the additional learning set SET2. Thereby, the collating server 20 can use not only the existing learning set SET1 during the collating processing, but also the additional learning set SET2 in which a sharpened image is separately generated and stored corresponding to the image quality degradation factor referred to when generating the sharpened image stored in the existing learning set SET1. Therefore, the collating server 20 can execute the collating processing quickly by using both the existing learning set SET1 and the additional learning set SET2.

The collating server 20 executes collating processing by using the existing learning set SET1, the additional learning set SET2, and the image correction model. Thereby, the collating server 20 can specify the face image used for the collating processing with the face image of the person registered in the registration database 23 at an early stage and with high accuracy, based on the sharpened image generated by the monitoring camera 10 corresponding to the image quality degradation factor at the time of imaging outdoors during the collating process, thereby improving the reliability of the collating processing.

The existing learning set SET1 stores k (k: an integer of 2 or more) different images related to the object. The additional learning set SET2 stores k different sharpened images corresponding to the respective images related to the object stored in the existing learning set SET1. Thereby, compared with the case where only the existing learning set SET1 is used during the collating processing, the collating server 20 can use twice (that is, 2k) sharpened images, and therefore the collating processing can be executed more quickly. Needless to say, the number of sharpened images stored in the additional learning set SET2 is not limited to k.

The image quality degradation factor is unevenness occurring in a partial region of the object due to sunlight. The collating server 20 generates unevenness in a partial region of the image related to the object read from the existing learning set SET1 in a pseudo manner, generates a sharpened image corresponding to the generated pseudo image by using the image correction model, and stores the sharpened image in the additional learning set SET2. Thereby, even if unevenness occurs due to the depression of the object (for example, a person's face) in an environment where sunlight is strongly emitted outdoors, the collating server 20 can generate a sharpened image (for example, an image in which the brightness and luminance values of a degraded portion where unevenness occurs are increased by a predetermined rate than those of other portions) that compensates for image quality degradation due to the unevenness by using the image correction model and store the sharpened image in the additional learning set SET2. Therefore, when the corrected image sent from the monitoring camera 10 is the same as or similar to the sharpened image stored in the additional learning set SET2, the collating accuracy of the collating processing in the collating server 20 can be improved.

The image quality degradation factor is a shadow occurring in a partial region of the object due to sunlight. The collating server 20 generates a shade in a partial region of the image related to the object read from the existing learning set SET1 in a pseudo manner, generates a sharpened image corresponding to the generated pseudo image by using the image correction model, and stores the sharpened image in the additional learning set SET2. Thereby, even if a shadow occurs in a partial region of an object (for example, a person's face) due to wearing a hat or the like in an environment where sunlight is strongly emitted outdoors, the collating server 20 can generate a sharpened image (for example, an image obtained by estimating or interpolating a portion disappeared by a shadow from a surrounding image region by a known technique) that compensates for image quality degradation due to the shadow by using the image correction model and store the sharpened image in the additional learning set SET2. Therefore, when the corrected image sent from the monitoring camera 10 is the same as or similar to the sharpened image stored in the additional learning set SET2, the collating accuracy of the collating processing in the collating server 20 can be improved.

The image quality degradation factor is low illuminance noise occurring on an object due to night imaging. The collating server 20 generates low illumination noise in the entire image related to the object read from the existing learning set SET1 in a pseudo manner, generates a sharpened image corresponding to the generated pseudo image by using the image correction model, and stores the sharpened image in the additional learning set SET2. Thereby, even if low illumination noise occurs in the entire object outdoors in a dark or dark environment at night, the collating server 20 can generate a sharpened image (for example, an image obtained by suppressing a portion having low illuminance noise by a known technique such as noise reduction processing) that compensates for image quality degradation due to the low illuminance noise by the image correction model and store the sharpened image in the additional learning set SET2. Therefore, when the corrected image sent from the monitoring camera 10 is the same as or similar to the sharpened image stored in the additional learning set SET2, the collating accuracy of the collating processing in the collating server 20 can be improved.

The image quality degradation factor is white saturation that occurs in the object due to IR light emitted from the IR-LED 18 provided in the monitoring camera 10 at night. The collating server 20 generates white saturation in the entire image related to the object read from the existing learning set SET1 in a pseudo manner, generates a sharpened image corresponding to the generated pseudo image by using the image correction model, and stores the sharpened image in the additional learning set SET2. Thereby, even if white saturation occurs in the entire object in an environment where high-intensity IR light is emitted from the IR-LED 18 included in the monitoring camera 10 outdoors, the collating server 20 can generate a sharpened image (for example, an image that emphasizes the edges and contours that make up the object) that compensates for image quality degradation due to the white saturation by using the image correction model and store the sharpened image in the additional learning set SET2. Therefore, when the corrected image sent from the monitoring camera 10 is the same as or similar to the sharpened image stored in the additional learning set SET2, the collating accuracy of the collating processing in the collating server 20 can be improved.

When the collating server 20 has the registration database 23 in which face images of a plurality of suspicious persons are registered in advance and a face image that matches the sharpened image used in the collating processing is extracted, the collating server 20 sends the collating processing in which the extracted face image and the cut-out image of the object are associated with the identification information of the object to the client PC 30. Thereby, a user (for example, the operator or administrator of the collating system 1) of the client PC 30 can easily grasp the result of the collating processing by the collating server 20 on the collating result screen RST1.

The collating server 20 performs learning processing for generating, for example, k different sharpened images corresponding to the respective images related to the object stored in the existing learning set SET1 before starting the actual operation of the collating system 1. Thereby, the learning result for improving the precision of the collating processing in the collating server 20 can be accumulated in the collating server 20 in advance before the actual operation of the collating system 1 is started.

The collating server 20 performs learning processing for generating, for example, k different sharpened images corresponding to the respective images related to the object stored in the existing learning set SET1 during the actual operation of the collating system 1. Thereby, the collating server 20 can execute the same learning processing even during the actual operation of the collating system 1 to enrich the contents and the accumulation amount of the additional learning set SET2, and it is possible to further improve the accuracy of the collating processing.

The monitoring camera 10 sends the cut-out image of the object, the corrected image (sharpened image), and the parameters related to the image processing executed at the time of generating the captured image to the collating server 20 in association with the identification information of the object. Here, the parameters related to the image processing are, for example, parameters such as the types of image processing executed by the monitoring camera 10 and various numerical values used in the image processing. The types of image processing include, for example, analog-digital conversion, resolution conversion, aperture conversion, gamma correction, noise removal, and contour (edge) enhancement. The collating server 20 records the parameters sent from the monitoring camera 10 in association with the sharpened image of the object for learning processing and executes the learning processing by using the parameters. Thereby, the collating server 20 can refer to parameters such as the type and numerical value of the image processing executed by the monitoring camera 10 as an image to be added to the additional learning set SET2 in the learning processing and execute the learning processing after efficiently determining what kind of image (sharpened image) should be added.

While various embodiments have been described above with reference to the drawings, it goes without saying that the present disclosure is not limited to such examples. It is obvious for those skilled in the art that various examples with changes, modifications, substitutions, additions, deletions, and equivalents can be conceived within the scope of the claims and of course, it is understood that the examples belong to the technical scope of the present disclosure. In the range which does not deviate from the gist of the invention, the constituent elements in the various embodiments described above may be arbitrarily combined.

The present disclosure supplies a program for realizing the functions of the PC 30 of the above embodiment to a device via a network or various storage media, and a program that is read and executed by a computer in the device is also applicable.

The present disclosure is useful as a collating system, a collating method, and a camera device that accurately improve the accuracy of collating processing for determining whether the captured image of the imaged object matches the monitoring object registered in the database in advance and suppress the decrease in convenience of monitoring work even in an environment where an object is imaged outdoors.

The present application is based upon Japanese Patent Application (Patent Application No. 2019-002005 filed on Jan. 9, 2019), the contents of which are incorporated herein by reference.

What is claimed is:

1. A collating system comprises:
   a camera device configured to capture image data of a monitoring target area; and
   a server device communicably connected to the camera, and the server device is configured to
      store a plurality of reference images from a plurality of viewpoints;
      store an image correction model;
      process the reference images using the image correction model to generate a plurality of corresponding sharpened reference images;
      store the sharpened reference images;
      send, to the camera device, the image correction model,
   wherein the camera device is configured to
      detect an object appearing in the captured image data of the monitoring target area,
      generate a target image of the object from the captured image data,
      generate, using the image correction model received from the server device, a sharpened image based on the target image of the object, and
      send the sharpened image to the server device, and
   wherein the server device is configured to:
      receive and store the sharpened image sent from the camera device,
      perform collating processing of the object corresponding to the sharpened image based on the sharpened image generated using the image correction model, and the plurality of sharpened reference images generated using the same image correction model used by the camera, and
      send a result of the collating processing including identification information of the object to an external device,
   wherein the server device is further configured to
      store a first image set including an image related to the object,
      improve an image quality degradation factor caused by capturing of the object based on the image related to the object and the image correction model, and
      add the generated sharpened image in a second image set stored in the server device,
   wherein the image quality degradation factor is unevenness occurring in a partial region of the object appearing in the captured image due to sunlight, and
   wherein the server device
      generates a pseudo unevenness in a partial region of the image related to the object read from the first image set, generates a sharpened image corresponding to the image having the pseudo unevenness based on the image correction model, and
adds the sharpened image in the second image set stored in the server device.

2. The collating system according to claim 1,
wherein the server device is configured to perform the collating processing based on the first image set, the second image set, and the image correction model.

3. The collating system according to claim 1,
wherein the first image set includes k number of different images related to the object,
wherein the k is an integer that greater than or equal to 2, and
wherein the second image set includes the k number of different sharpened images corresponding to the respective images related to the object stored in the first image set stored in the server device.

4. The collating system according to claim 3,
wherein the server device performs learning processing for generating the k number of different sharpened images corresponding to the respective images related to the object included in the first image set before starting actual operation of the collating system.

5. The collating system according to claim 3,
wherein the server device performs learning processing for generating the k number of different sharpened images corresponding to the respective images related to the object included in the first image set during actual operation of the collating system.

6. The collating system according to claim 5,
wherein the camera device sends parameters related to capturing processing performed at the time of generating the target image of the object, the sharpened image, and the captured image to the server device in association with identification information of the object, and
wherein the server device stores the parameters sent from the camera device in association with the sharpened image and executes the learning processing based on the parameters.

7. The collating system according to claim 1,
wherein the image quality degradation factor is low illuminance noise occurring in the object appearing in the captured image due to night capturing, and
wherein the server device
generates a pseudo low illuminance noise in an entire image related to the object read from the first image set,
generates a sharpened image corresponding to the image having the pseudo low illuminance noise based on the image correction model, and
adds the sharpened image in the second image set stored in the server device.

8. The collating system according to claim 1,
wherein the image quality degradation factor is white saturation occurring in the object appearing in the captured image due to IR light emitted from an IR illuminator included in the camera device at night, and
wherein the server device
generates a pseudo white saturation in an entire image related to the object read from the first image set,
generates a sharpened image corresponding to the image having the pseudo white saturation based on the image correction model, and
adds the sharpened image in the second image set stored in the server device.

9. The collating system according to claim 1,
wherein the server device has a registration database that stores face images of a plurality of suspicious persons in advance, and
wherein in a case where the server device extracts a face image that corresponds with the sharpened image used in the collating processing, the server device sends, to the external device, the collating processing result in which the extracted face image and the target image of the object are associated with the identification information of the object.

10. The collating system according to claim 1,
wherein the camera device sends, to the server device, the target image along with the sharpened image.

11. The collating system according to claim 1,
wherein the camera device sends, to the server device, the sharpened image in association with identification information of the object.

12. The collating system according to claim 1,
wherein the monitoring target area is located outdoors and subject to environmental factors.

13. The collating system according to claim 1,
wherein the image correction model is generated based on existing learning dataset in the server device, and is updated with additional learning dataset provided by the camera device.

14. A collating method implemented by a collating system including a camera device and a server device that are communicably connected to each other,
the collating method comprising:
storing, by the server device, a plurality of reference images from a plurality of viewpoints;
storing, by the server device, an image correction model;
processing, by the server device, the reference images using the image correction model to generate a plurality of corresponding sharpened reference images;
storing, by the server device, the sharpened reference images;
capturing, by the camera device, image data of a monitoring target area,
receiving, by the camera device and from the server device, the image correction model stored at the server device,
detecting, by the camera device, an object appearing in the captured image data of the monitoring target area and generating a target image of the object from the captured image data,
generating, by the camera device and using the correction model received from the server device, a sharpened image to be used for collating processing of the object performed by the server device based on the target image of the object,
sending, by the camera device, the sharpened image to the server device,
receiving and storing, by the server device, the sharpened image sent from the camera device,
performing, by the server device, collating processing of the object corresponding to the sharpened image based on the sharpened image generated using the image correction model, and the plurality of sharpened reference images generated using the same image correction model used by the camera,
sending, by the server device, a result of the collating processing including identification information of the object to an external device, storing, by the server device, a first image set including an image related to the object, improving, by the server device, an image quality degradation factor caused by capturing of the object based on the image related to the object and the image correction model, adding, by the server device, the generated sharpened image in a second image set stored in the server device, wherein the image quality degradation factor is unevenness occurring in a partial region of the object appearing in the captured image due to sunlight, generating, by the server device, a pseudo unevenness in a partial region of the image related to the object read from the first image set, generating, by the server device, a sharpened image corresponding to the image having the pseudo unevenness based on the image correction model, and adding, by the server device, the sharpened image in the second image set stored in the server device.

15. A collating system comprises:

a camera device configured to capture image data of a monitoring target area; and a server device communicably connected to the camera, and the server device is configured to store a plurality of reference images from a plurality of viewpoints;

store an image correction model;

process the reference images using the image correction model to generate a plurality of corresponding sharpened reference images;

store the sharpened reference images;

send, to the camera device, the image correction model, wherein the camera device is configured to detect an object appearing in the captured image data of the monitoring target area, generate a target image of the object from the captured image data, generate, using the image correction model received from the server device, a sharpened image based on the target image of the object, and send the sharpened image to the server device, wherein the server device is configured to:

receive and store the sharpened image sent from the camera device, perform collating processing of the object corresponding to the sharpened image based on the sharpened image generated using the image correction model, and the plurality of sharpened reference images generated using the same image correction model used by the camera, and send a result of the collating processing including identification information of the object to an external device, wherein the server device is further configured to store a first image set including an image related to the object, improve an image quality degradation factor caused by capturing of the object based on the image related to the object and the image correction model, and add the generated sharpened image in a second image set stored in the server device wherein the image quality degradation factor is a shadow occurring in a partial region of the object appearing in the captured image due to sunlight, and wherein the server device generates a pseudo shadow in a partial region of the image related to the object read from the first image set, generates a sharpened image corresponding to the image having the pseudo shadow based on the image correction model, and adds the sharpened image in the second image set stored in the server device.

16. A collating method implemented by a collating system including a camera device and a server device that are communicably connected to each other, the collating method comprising:

storing, by the server device, a plurality of reference images from a plurality of viewpoints;

storing, by the server device, an image correction model;

processing, by the server device, the reference images using the image correction model to generate a plurality of corresponding sharpened reference images;

storing, by the server device, the sharpened reference images;

capturing, by the camera device, image data of a monitoring target area, receiving, by the camera device and from the server device, the image correction model stored at the server device, detecting, by the camera device, an object appearing in the captured image data of the monitoring target area and generating a target image of the object from the captured image data, generating, by the camera device and using the correction model received from the server device, a sharpened image to be used for collating processing of the object performed by the server device based on the target image of the object, sending, by the camera device, the sharpened image to the server device, receiving and storing, by the server device, the sharpened image sent from the camera device, performing, by the server device, collating processing of the object corresponding to the sharpened image based on the sharpened image generated using the image correction model, and the plurality of sharpened reference images generated using the same image correction model used by the camera, and sending, by the server device, a result of the collating processing including identification information of the object to an external device, storing, by the server device, a first image set including an image related to the object, improving, by the server device, an image quality degradation factor caused by capturing of the object based on the image related to the object and the image correction model, adding, by the server device, the generated sharpened image in a second image set stored in the server device, wherein the image quality degradation factor is a shadow occurring in a partial region of the object appearing in the captured image due to sunlight, generating, by the server device, a pseudo shadow in a partial region of the image related to the object read from the first image set, generating, by the server device, a sharpened image corresponding to the image having the pseudo shadow based on the image correction model, and adding, by the server device, the sharpened image in the second image set stored in the server device.

* * * * *